United States Patent Office 3,192,819
Patented July 6, 1965

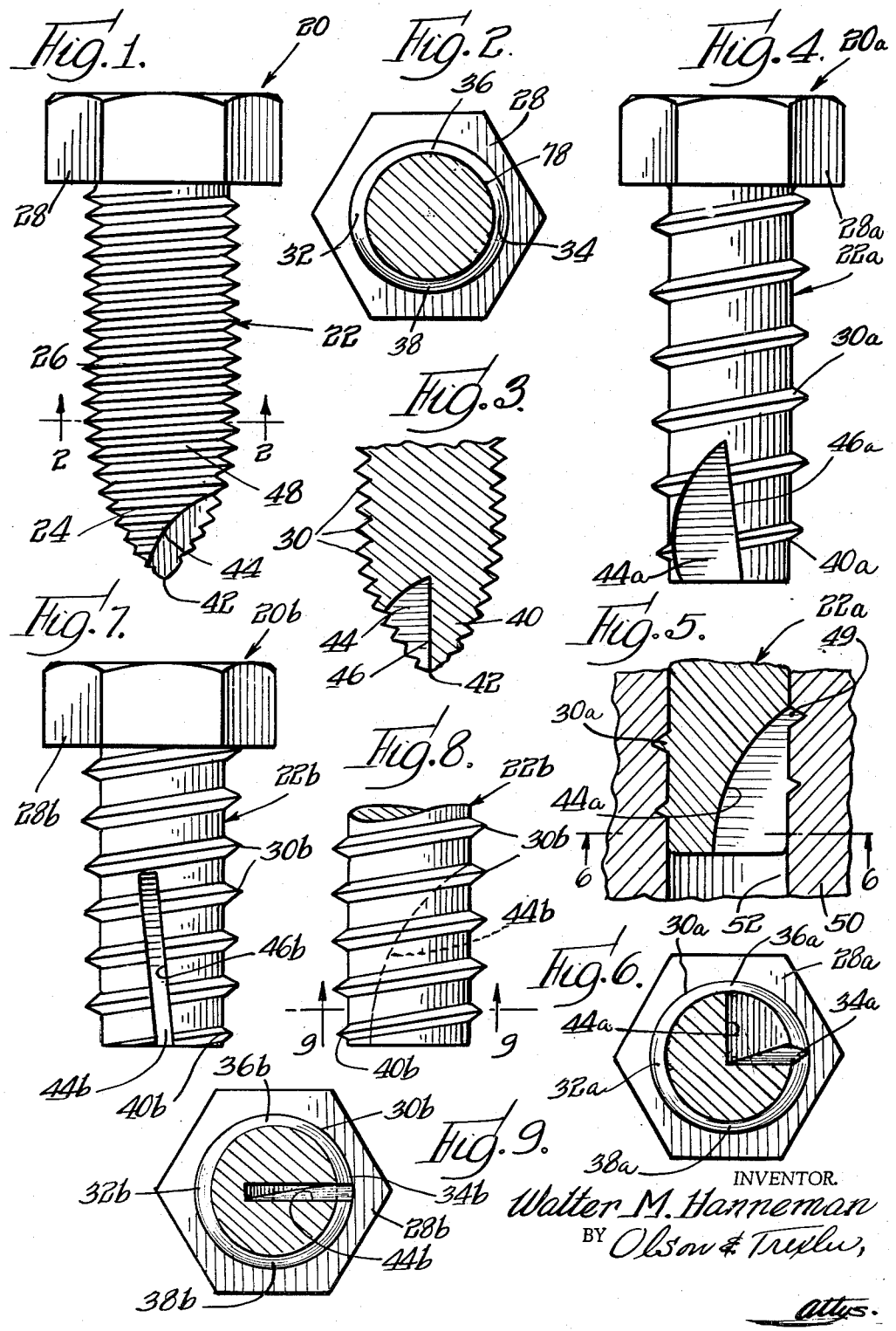

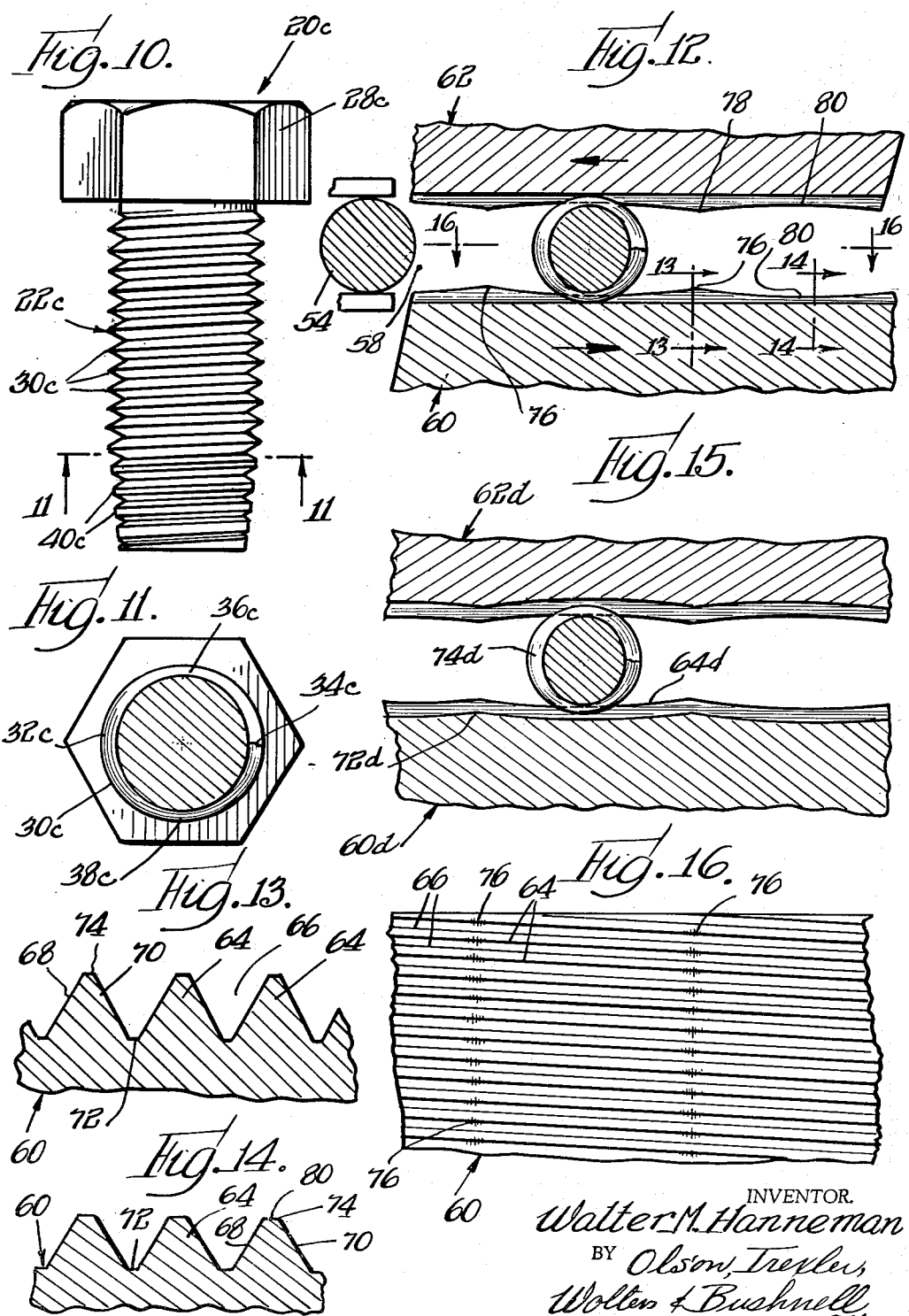

3,192,819
THREAD FORMING SCREW HAVING OVAL
THREADS AND A CUTTING EDGE
Walter M. Hanneman, Wheaton, Ill., assignor to Illinois
Tool Works Inc., a corporation of Delaware
Filed Apr. 3, 1961, Ser. No. 100,225
1 Claim. (Cl. 85—47)

The present invention relates to a novel screw structure and a method and apparatus for producing the same, and more specifically to a novel screw structure especially suitable for application to an unthreaded workpiece and adapted to form complementary thread convolutions in the workpiece during application of the screw to the workpiece.

Screw structures have heretofore been proposed which are adapted to cut, impress or otherwise form complementary threads in an unthreaded workpiece. While certain of such heretofore proposed screw structures have been generally satisfactory for their intended purpose, the construction has been such that a relatively high resistance is encountered during application to an unthreaded workpiece aperture so that a relatively high driving torque must be applied to such screw members. Furthermore, certain heretofore proposed devices are constructed so that they are relatively uneconomical to produce.

An important object of the present invention is to provide a novel screw member and a novel method and apparatus for producing the same whereby the screw member may be economically produced and is adapted to be relatively easily applied to an unthreaded workpiece aperture.

A more specifiec object of the present invention is to provide a novel screw member which is constructed so as to reduce the amount of driving torque which must be applied thereto in order to turn the screw member into an unthreaded workpiece aperture while simultaneously forming complementary threads in the workpiece.

A further specific object of the present invention is to provide novel means or die structures whereby helical thread convolutions may be rapidly and economically rolled on screw members in a manner for providing such screw members with the above described improved characteristics.

Other objects and advantages of the present invention will become apparent from the following description and the accompanying drawing wherein:

FIG. 1 is an elevational view showing a screw member incorporating one embodiment of the present invention;

FIG. 2 is a sectional view taken along line 2—2 in FIG. 1;

FIG. 3 is a fragmentary elevational view showing a portion of the screw member turned 90° from the position shown in FIG. 1;

FIG. 4 is an elevational view showing a modified form of the present invention;

FIG. 5 is a fragmentary sectional view showing a portion of a screw member of FIG. 4 turned 90° from the position shown in FIG. 4 and partially applied to an unthreaded apertured workpiece;

FIG. 6 is a sectional view taken along line 6—6 in FIG. 4;

FIG. 7 is an elevational view showing another modified form of the present invention;

FIG. 8 is a fragmentary elevational view showing a portion of the device of FIG. 7 turned 90° from the position shown in FIG. 7;

FIG. 9 is a sectional view taken along line 9—9 in FIG. 8;

FIG. 10 is an elevational view showing another embodiment of the present invention;

FIG. 11 is a sectional view taken along line 11—11 in FIG. 10;

FIG. 12 is a fragmentary sectional view showing a method and means for forming a screw members in accordance with features of the present invention;

FIG. 13 is an enlarged fragmentary sectional view taken along line 13—13 in FIG. 12;

FIG. 14 is an enlarged fragmentary sectional view taken along line 14—14 in FIG. 12;

FIG. 15 is a view similar to FIG. 12 but shows a modified form of the present invention; and FIG. 16 is a view taken along line 16—16 in FIG. 12.

Referring now more specifically to the drawings wherein like parts are designated by the same numerals throughout the various figures, a screw member 20 incorporating features of the present invention is shown in FIGS. 1, 2 and 3. The screw member comprises an elongated shank section 22 having a tapering entering end portion 24 and a trailing holding portion 26. In the embodiment shown, the screw member is also provided with a head section 28 integral with the trailing end of the shank although it is to be understood that features of the present invention may be incorporated in the headless screw members or studs. The head section 28 may be provided with any desired or known configuration and may be slotted or otherwise adapted for cooperable engagement with a tool which is to be used for applying the screw member to a workpiece.

In accordance with features of the present invention helically continuous thread convolutions 30 are formed on the shank 22 and along the entering and holding portions 24 and 26 thereof in a novel manner so as to facilitate entry of the screw member into an unthreaded workpiece and the formation of complementary thread convolutions in the workpiece. More specifically, the thread convolutions 30 are formed so as to provide the shank 22 with a generally oval or elliptical cross sectional configuration as shown in FIG. 2. In other words, first diametrically opposite portions 32 and 34 of the thread convolutions which are substantially bisected by the major axis of the elliptical cross sectional configuration project radially from the central longitudinal axis of the shank 22 a distance greater than second generally diametrically opposite portions 36 and 38 of the thread convolutions which are substantially bisected by the minor axis of the ellipse.

As shown in FIG. 2, the elliptical configuration of the thread convolutions is somewhat exaggerated for illustration purposes. However, it is to be noted that the circumferentially limited generally diametrically opposite thread portions 32 and 34 serve as primary workpiece engaging and thread forming elements during application of the screw member to an unthreaded workpiece while contact between the thread portions 36 and 38 and the workpiece is minimized. With this structure, the workpiece or complementary thread forming pressures are concentrated at the areas of engagement between the thread portions 32 and 34 and the workpiece and these thread portions provide slightly oversized complementary threads in the workpiece so that engagement between the workpiece threads and the portions 36 and 38 of the screw member threads is minimized during the workpiece thread forming process. It has been found that this structure greatly facilitates the formation of the complementary threads in the workpiece and materially reduces the amount of torque which must be applied to the screw member in order to drive the screw member into an unthreaded workpiece. While the complementary threads formed in the workpiece aperture will be slightly oversize with respect to the thread portions 36 and 38, the thread portions 36 and 38 will nevertheless extend into overlapping relationship with the complementary threads of the workpiece sufficiently so that the holding power of the screw member or the resistance to stripping of the threads is not materially adversely affected.

As shown in FIGS. 1 and 3, portions 40 of the thread convolutions 30 which extend along the tapering entering end 24 of the shank are preferably only partially formed and are of diminishing heighth toward the terminal end of the shank so as to facilitate starting of the screw member into a workpiece. Furthermore, in this embodiment the entering end portion tapers to a point 42 and a slot 44 is formed in the entering end portion so that a side thereof intersects the peripheral surface of the shank for providing a cutting edge 46. Thus, the screw member is adapted to drill or enlarge a hole in a workpiece and to initiate the formation of the complementary thread in the workpiece by cutting action. Preferably, the cutting edge 46 in this embodiment terminates short of the junction between the tapering shank portion 24 and the full diameter shank portion 26 so that the complementary threads in the workpiece will be only partially cut by the edge 46 after which they will be completed by a cold working and forming of the workpiece material as the screw threads of progressively varying heighth at the junction 48 between the entering and holding portions 24 and 26 of the shank and the trailing fully formed thread convolutions 30 are driven into the workpiece. It is to be noted that the slot 44 is disposed so that the cutting edge 46 lies substantially in a plane containing the major axis of the elliptical configuration of the thread convolutions. In other words, the cutting edge is located along a line of greatest radial extent of the successive increments of the tapering entering end portion so as to obtain maximum cutting effectiveness.

FIGS. 4–6 show another embodiment of the present invention which is similar to the screw member described above as indicated by the application of identical reference numerals with the suffix $a$ added to corresponding elements. This embodiment shows features of the invention incorporated in a screw member wherein the thread convolutions 30a are substantially spaced along the shank and the cutting edge 46a is slightly inclined relative to but still approximately in a plane containing the major axis of the generally elliptical configuration of the thread convolutions. In addition, FIGS. 5 and 6 show the manner in which screw members incorporating features of the present invention are adapted to form complementary thread convolutions 49 in a workpiece 50 having an unthreaded aperture 52 therein.

FIGS. 7–9 show a screw member 20b similar to the structures described above as indicated by the application of identical reference numerals with the suffix $b$ to corresponding elements. This embodiment shows a construction wherein the slot 44b is provided with a long narrow configuration which may readily be formed with the aid of a rotary saw.

In FIGS. 10 and 11 there is shown a screw member 20c similar to the structures described above as indicated by the application of identical reference numerals with the suffix $c$ added to corresponding elements. In this embodiment, the aforementioned slots are omitted from the screw shank so that the device 20c is adapted to produce the complementary threads in the workpiece substantially entirely by a cold working and forming process.

FIGS. 12–14 and 16 show a method and means for making screw members in accordance with features of the present invention. More specifically, screw blanks 54 are successively fed along guide means 56 to a work station 58 at which they are introduced between a pair of thread rolling die blocks 60 and 62 as shown in FIG. 12. The die blocks are then moved relative to each other in the direction of the arrows shown in FIG. 12 so that a screw blank is rolled therebetween for forming the helical thread convolutions thereon. The portions of the apparatus for feeding the blanks along the guide means 56, for inserting the blanks from the guide means between the die blocks and for relatively moving the die blocks may incorporate various known constructions and therefore need not be decsribed in detail.

Each of the die blocks 60 and 62 includes a plurality of thread forming ribs 64 extending generally longitudinally and diagonally thereof, which ribs define grooves 66 therebetween. As indicated in FIG. 13, the ribs and grooves have a generally triangular configuration when viewed in cross section, which configuration corresponds to the cross section of the thread convolutions to be formed on the screw member. Thus, each of the ribs 64 includes opposite sides or flank surfaces 68 and 70 which extend from the bottoms of the grooves or roots 72 of the ribs and converge toward crests 74 of the ribs. In this embodiment, the bottoms of the grooves or, in other words, the roots of the ribs are straight and of uniform depth. However, in accordance with features of the present invention, the crests 74 of the ribs are partially removed or hollowed out between points 76 spaced therealong. The spacing of the points 76 is approximately equal to the circumference of the roots 78 of the thread convolutions to be formed on the screw blank. As shown in FIG. 12, the crests of the ribs are progressively removed in both directions from each of the points 76 to low points 80 substantially midway between the points 76. Thus, the ribs are of full depth and maximum heighth at the points 76 as shown in FIGS. 12 and 13, and of only partial depth and minimum height at the points 80 as shown in FIGS. 12 and 14.

The unthreaded shanks of the screw blanks are provided with a diameter which is greater than the distance between the generally opposing high points 76 of the opposing die blocks 60 and 62 but less than the distance between the bottoms of the grooves or roots 72 of the ribs of the opposing die blocks. Thus, when the shank of a screw blank is rolled between the opposing die blocks 60 and 62, the ribs 64 will be forced into the sides of the shank and material of the shank between the ribs will be formed or extruded so as to produce the aforementioned thread convolutions. It is to be noted that in accordance with features of the present invention, the high points 76 of the ribs will penetrate the screw shank to a greater extent than the low points 80 of the ribs. As a result, the high points 76 of the ribs will form or extrude greater amounts of material from the screw shank so as to produce full depth thread convolutions of maximum radial extent. It will also be observed that the progressively lower portions of the ribs will penetrate the screw shank progressively lesser amounts so as to form or extrude smaller quantities of the shank material into the thread convolutions. In other words, the high portions of the ribs are adapted to form full depth thread portions of maximum radial extent while the lower portions of the ribs form only partial depth thread portions of less radial extent so that each complete helical thread convolution 30 of a finished screw member is provided with a generally oval or elliptical crest as described in detail above.

FIG. 15 shows die members constructed in accordance with a modified form of the present invention, which die members are similar to those described above as indicated by the application of identical reference numerals with the suffix $d$ added to corresponding elements. The structure of this embodiment differs in that the roots or groove bottoms 72, rather than being straight, are formed so as substantially to follow the contours of the crests 74d. Thus, the ribs 64d are of substantially uniform cross sectional configuration along their entire length. More specifically, the cross sectional configuration of the ribs at their low points is substantially the same as at their high points. As a result, the threaded convolutions will be formed on the screw member shank so as to provide the above described oval or elliptical peripheral configuration while at the same time being of substantially uniform depth and cross sectional configuration, at least along the holding portion of the screw member shank. It is to be understood that all of the embodiments of the screw member described above may selectively be formed either with the dies of FIG. 12 or the dies of FIG. 15. Thus, it is contemplated that all of the embodiments disclosed herein will include thread convolutions having crests of a generally oval or elliptical configuration and being either of full depth entirely around the screw shank or of slightly varying depth, depending on which of the die structures is used to form the thread convolutions.

While the preferred embodiments of the present invention have been shown and described herein, it is obvious that many structural details may be changed without departing from the spirit and scope of the appended claim.

The invention is claimed as follows:

A screw member adapted for application to an unthreaded workpiece; and comprising a headed shank having thread convolutions extending from the leading end toward the head and including full size thread convolutions providing a holding section spaced from the leading end, the thread convolutions tapering from the holding section toward the leading end to facilitate initial application thereof to a workpiece, the periphery of the thread convolutions in transverse section normal to the shank axis defining an oval with major and minor crest axes with the minor crest diameter greater than the major root diameter, the shank having a longitudinal slot from the leading end through at least one full size thread convolution on the major axis with the thread convolutions continuous from one edge of the slot to the opposite edge thereof, the said slot providing a serrated cutting edge located substantially along a longitudinal line defined by the intersection of the major axis with the thread periphery, the thread periphery disposed diametrically opposite to said cutting edge providing a firm work engaging abutment to resist transverse forces resulting from opeartive rotative engagement of the cutting edge with the workpiece.

References Cited by the Examiner
UNITED STATES PATENTS

| 1,912,517 | 6/33 | De Lapotterie | 10—140 |
| 1,987,474 | 1/35 | Grant | 85—47 |
| 2,165,009 | 7/39 | Rosenberg | 80—9 |
| 2,255,997 | 9/41 | Hanneman | 85—47 |
| 2,278,411 | 4/42 | Braendel | 80—61 |
| 2,352,982 | 7/44 | Tomalis | 85—47 |
| 2,414,870 | 1/47 | Harding | 151—22 |
| 3,050,755 | 8/62 | Welles | 10—152 |

FOREIGN PATENTS

| 4,149 | 2/07 | Great Britain. |
| 223,231 | 6/56 | Japan. |

EDWARD C. Allen, *Primary Examiner.*

CARL W. TOMLIN, *Examiner.*